(12) United States Patent
Kerger

(10) Patent No.: US 6,776,181 B2
(45) Date of Patent: Aug. 17, 2004

(54) SAFETY VALVE FOR PRESSURIZED FLUID TANKS

(75) Inventor: Léon Kerger, Helmdange (LU)

(73) Assignee: Luxembourg Patent Company S.A., Luxembourg (LU)

( * ) Notice: Subject to any disclaimer, the term of this patent is extended or adjusted under 35 U.S.C. 154(b) by 143 days.

(21) Appl. No.: 10/193,421

(22) Filed: Jul. 11, 2002

(65) Prior Publication Data

US 2003/0015236 A1 Jan. 23, 2003

(30) Foreign Application Priority Data

Jul. 19, 2001 (EP) .............................................. 01202779

(51) Int. Cl.$^7$ .............................................. F16K 17/38
(52) U.S. Cl. ........................ 137/74; 137/72; 220/89.4
(58) Field of Search ............................. 137/72, 74, 79; 220/89.4

(56) References Cited

U.S. PATENT DOCUMENTS

| | | | | |
|---|---|---|---|---|
| 47,076 A | * | 3/1865 | Smith | 137/74 |
| 2,742,179 A | * | 4/1956 | Livers | 220/89.4 |
| 3,139,103 A | * | 6/1964 | Bottum | 137/72 |
| 3,245,423 A | * | 4/1966 | Hansen et al. | 137/74 |
| 3,490,473 A | * | 1/1970 | Weiner et al. | 137/74 |
| 4,088,436 A | * | 5/1978 | Alferes | 137/74 |
| 4,365,643 A | * | 12/1982 | Masclet et al. | 137/72 |
| 4,744,383 A | | 5/1988 | Visnic et al. | |
| 4,922,944 A | * | 5/1990 | Mueller et al. | 137/72 |
| 5,435,333 A | * | 7/1995 | Duvall | 220/89.4 |
| 5,562,117 A | | 10/1996 | Borland et al. | |
| 5,632,297 A | | 5/1997 | Sciullo et al. | |
| 5,941,269 A | * | 8/1999 | Ingle | 137/74 |
| 6,367,500 B1 | | 4/2002 | Kerger et al. | |

* cited by examiner

*Primary Examiner*—John Rivell
(74) *Attorney, Agent, or Firm*—Leydig, Voit & Mayer, Ltd.

(57) ABSTRACT

The valve is intended to be opened at a predetermined temperature in order to release the pressurized fluid from the tank and its opening is triggered by melting of a meltable material. It comprises a body in the shape of a socket (10), the open end of which is exposed to the gas pressure and the bottom of which is closed except for a minuscule orifice (12). The side wall of the body (10) comprises at least one radial opening (14) and the body (10) is engaged, by its bottom, by sliding, in a cap (16) of complementary shape and is fastened thereto by means of the meltable material (18). The cap (16) comprises at least one access (20) to the atmosphere and, after melting of the meltable material (18), can be moved with respect to the body (10) until each access (20) communicates with a side opening (14) in the body (10).

3 Claims, 1 Drawing Sheet

SAFETY VALVE FOR PRESSURIZED FLUID TANKS

FIELD OF THE INVENTION

The present invention relates to a safety valve for a tank or a pipe for pressurized fluid, intended to be opened at a predetermined temperature in order to release the pressurized fluid and the opening of which is triggered by the melting of a meltable material.

BACKGROUND OF THE INVENTION

Such safety valves are used to prevent the risk of the tank exploding when its temperature exceeds a predetermined limit. This is because, at this temperature, which may be of the order of 100° C., the meltable material, which may be a meltable metal, melts and makes it possible for the gases and the excess pressure to escape. Below this critical temperature, the meltable metal should normally remain solid and prevent any leak of pressure and of gas.

Unfortunately, it has been noticed that it happens that the meltable metal is prematurely, that is to say at temperatures less than its melting temperature, subject to plastic flow. It has been noticed that these cases occur when the gas is stored at high pressures and that the origin of this plastic flow is the combination of temperature and pressure. It has in fact been found that if such a meltable metal is exposed for a relatively long time to high pressures, it may deform and thus release gases below the melting temperature. There is therefore an undesired leak with risk of accident and risk for the environment. Furthermore, the material of the meltable metal to be replaced is excessively expensive.

Document EP 1069355 describes such a safety valve which comprises a plug made of meltable material intended to melt at a predetermined temperature in order to release the pressurized gas of a tank. The meltable plug is subject to the action of a differential action sliding piston intended to reduce at least some of the effect of the gas pressure on the meltable plug to prevent the plug melting at a temperature less than the predetermined temperature under the effect of the pressure.

BRIEF SUMMARY OF THE INVENTION

The aim of the present invention is to provide a novel safety valve which also makes it possible to extract the meltable material at the gas pressure and which requires a smaller amount of meltable material than the known valves.

To achieve this objective, the present invention provides a valve of the type described in the preamble, which is characterized in that it comprises a body in the shape of a socket, the open end of which is exposed to the gas pressure and the bottom of which is closed except for a minuscule orifice, in that the side wall of the body comprises at least one radial opening, in that the body is engaged, by its bottom, by sliding, in a cap of complementary shape and is fastened thereto by means of the meltable material, in that the said cap comprises at least one access to the atmosphere, in that the cap, after melting of the meltable material, can be moved axially with respect to the body until each access communicates with a side opening in the body.

The cap preferably comprises a stop which limits the relative movement between the cap and the body in the position where the windows are released.

Thus, in the closed position of the valve, when the meltable metal is solid, the latter is subject only to a very small force through the orifice at the bottom of the socket. This force is not enough to adversely affect the physical state of the meltable material. On the other hand, when the cap is exposed to a temperature exceeding the melting point of the metal, the latter melts and releases the cap from the body. The gas pressure, which is exerted through the orifice at the bottom of the socket, is then enough to move the cap with respect to the body until it is in the position where the side openings and the windows are aligned and through which the gas can escape.

Moreover, the invention has the advantage of requiring only very little meltable metal. In fact, it is enough to provide a thin film between the bottom of the cap and the bottom of the body in order to form a weld thereon and to fasten these two elements to each other.

BRIEF DESCRIPTION OF THE DRAWINGS

Other particular features of the invention will emerge from the detailed description of a preferred embodiment presented below, by way of illustration, with reference to the appended drawings in which.

DETAILED DESCRIPTION OF THE INVENTION

Figure 1:
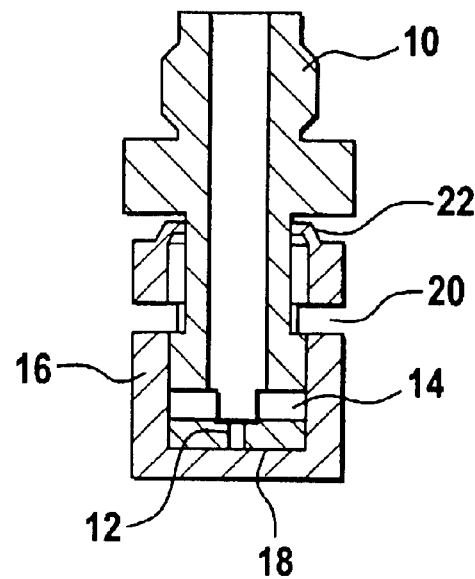
FIG. 1 shows an axial section through a safety valve in the closed position.

As can be seen in the figures, the valve comprises a body 10 in the shape of a socket which can be provided with an external thread in order to be screwed into the wall of a gas tank so that its open end is exposed to the gas pressure. The bottom of the body 10 is traversed axially by a minuscule orifice 12, while one or more openings 14 extend radially through the lateral surface of the body 10 in the bottom region thereof.

The bottom of the body 10 is engaged tightly in a cap 16 of complementary shape, cylinder-shaped in the example shown. Between the bottom of the cap 16 and the bottom of the body 10 there is a thin film of meltable metal 18, for example tin solder, which, in the solid state, fastens the cap 16 to the body 10.

Moreover, the cap comprises one or more lateral windows 20 corresponding to the openings 14 in the body 10 and allowing gases to escape on opening the valve. Moreover, the cap 16 comprises a re-entrant edge 22 which forms a stop during the relative movement between the cap 16 and the body 10 and which fixes the position of FIG. 2 in which the side openings 14 of the body 10 and the windows 20 of the cap 16 are mutually aligned.

In the closed position of FIG. 1, only a small force is exerted through the orifice 12 on the meltable metal, since this orifice 12 is exposed to the gas pressure. However, this force is not enough to adversely affect the physical state of the meltable metal and to undo the fastening between the body 10 and the cap 16. Consequently, there is a seal between these two elements so that the gases cannot escape.

Figure 2:
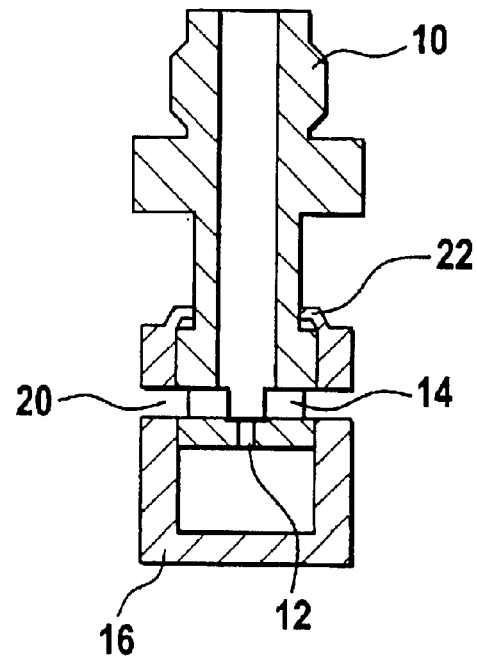
FIG. 2 shows an axial section through the same valve in the open position.

On the other hand, when, following excessive temperature, the meltable metal melts and the cap is released from its fastening with the body 10, the pressure through the orifice 12 becomes sufficient to generate a relative axial movement between the body 10 and the cap 16 up to the position of FIG. 2 in which the gas can escape and expand through the radial openings 14 and the windows 20.

Many modifications are possible or can be imagined without departing from the scope of the invention. Thus, for example, the body 10, instead of having a thread in order to be screwed onto a tank or a pipe, can be an integral part of the wall of a tank or of a pipe.

As for the side windows 20 in the cap 16, they can be replaced by any other means communicating with the atmosphere, for example a groove in the inner wall extending up to the open edge of the cap.

All of the references cited herein, including patents, patent applications, and publications, are hereby incorporated in their entireties by reference.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. Safety valve for a tank or a pipe for a pressurized fluid, intended to be opened at a predetermined temperature in order to release the pressurized fluid from the tank and the opening of which is triggered by melting of a meltable material, characterized in that it comprises a body in the shape of a socket (10), the open end of which is exposed to the gas pressure and the bottom of which is closed except for a minuscule orifice (12), in that the side wall of the body (10) comprises at least one radial opening (14), in that the body (10) is engaged, by its bottom, by sliding, in a cap (16) of complementary shape and is fastened thereto by means of the meltable material (18), in that the said cap (16) comprises at least one access (20) to the atmosphere, in that the cap (16), after melting of the meltable material (18), can be moved with respect to the body (10) until each access (20) communicates with a side opening (14) in the body (10).

2. Valve according to claim 1, characterized in that the cap (10) comprises a stop (22) which limits the relative movement between the cap (16) and the body (10) in the position where the said openings (14) are released.

3. Valve according to claim 1, characterized in that the said access to the atmosphere consists of one or more side windows (20) passing through the wall of the cap (16).

* * * * *